(12) United States Patent
Chieffi et al.

(10) Patent No.: US 12,139,840 B2
(45) Date of Patent: Nov. 12, 2024

(54) PHOTOACTIVATING DEVICE FOR WASHING MACHINE

(71) Applicant: The Procter & Gamble Company, Cincinnati, OH (US)

(72) Inventors: Andre Chieffi, Tynemouth (GB); Linsey Sarah Fuller, Newcastle upon Tyne (GB); Katarzyna Gorczynska-Costello, Newcastle upon Tyne (GB); Andrew Philip Moon, Tyne & Wear (GB); Stefano Scialla, Strombeek-Bever (BE); Matthew Scott Wagner, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 920 days.

(21) Appl. No.: 17/109,346

(22) Filed: Dec. 2, 2020

(65) Prior Publication Data
US 2021/0087738 A1 Mar. 25, 2021

Related U.S. Application Data

(63) Continuation of application No. PCT/US2019/035291, filed on Jun. 4, 2019.

(30) Foreign Application Priority Data

Jun. 11, 2018 (EP) .................................... 18176903

(51) Int. Cl.
*D06F 39/02* (2006.01)
*B65D 23/10* (2006.01)
(Continued)

(52) U.S. Cl.
CPC ......... *D06F 39/024* (2013.01); *B65D 23/102* (2013.01); *B65D 51/24* (2013.01);
(Continued)

(58) Field of Classification Search
CPC ......... A61L 2/10; D06F 35/00; D06F 39/024; D06F 2103/24; D06F 2105/42; B65D 51/24; C11D 11/0017; C11D 17/046
See application file for complete search history.

(56) References Cited

U.S. PATENT DOCUMENTS 3,393,153 A 7/1968 Zimmerer
3,635,828 A 1/1972 Benjamin
(Continued)

FOREIGN PATENT DOCUMENTS

CA 2079358 A1 3/1993
CN 1879546 A 12/2006
(Continued)

OTHER PUBLICATIONS

Machine Translation of WO-2010051808-A2, Trossowski, May 2010. (Year: 2010).*
(Continued)

*Primary Examiner* — David G Cormier
(74) *Attorney, Agent, or Firm* — Carolyn S. Powell

(57) ABSTRACT

Provided is a photoactivating device (100) for deployment in a washing machine for activating one or more photoactive components in a laundry treatment composition, comprising: a light source (160) configured for emission of light for activation of the one or more photoactive components; a controller (180), and a switch and/or a motion sensing unit (170), wherein the controller (180) is configured to control the light source (160) responsive to the switch and/or signals received from the motion sensing unit (170).

20 Claims, 6 Drawing Sheets

(51) Int. Cl.
  *B65D 51/24* (2006.01)
  *C11D 3/00* (2006.01)
  *C11D 3/20* (2006.01)
  *C11D 3/24* (2006.01)
  *C11D 3/28* (2006.01)
  *C11D 17/04* (2006.01)
  *D06F 103/24* (2020.01)
  *D06F 105/42* (2020.01)
  *H02J 50/10* (2016.01)

(52) U.S. Cl.
  CPC .......... *C11D 3/0063* (2013.01); *C11D 3/2096* (2013.01); *C11D 3/24* (2013.01); *C11D 3/28* (2013.01); *C11D 17/046* (2013.01); *C11D 2111/12* (2024.01); *D06F 2103/24* (2020.02); *D06F 2105/42* (2020.02); *H02J 50/10* (2016.02)

(56) References Cited

U.S. PATENT DOCUMENTS

| | | | |
|---|---|---|---|
| 3,714,151 A | 1/1973 | Lyness |
| 3,916,652 A | 11/1975 | Speakman |
| 3,927,967 A | 12/1975 | Speakman |
| 4,332,691 A | 6/1982 | Beavan |
| 4,460,373 A | 7/1984 | Shigeru |
| 4,497,741 A | 2/1985 | Hoelzle et al. |
| 4,524,014 A | 6/1985 | Finch |
| 4,526,700 A | 7/1985 | Hensley |
| 4,602,097 A | 7/1986 | Curtis |
| 4,668,418 A | 5/1987 | Ricchiero |
| 4,985,559 A | 1/1991 | Goldberg |
| 4,990,280 A | 2/1991 | Thorengaard |
| 5,057,236 A | 10/1991 | Petrin |
| 5,236,464 A | 8/1993 | Green |
| 5,330,672 A | 7/1994 | Langer |
| 5,332,014 A | 7/1994 | Feig |
| 5,451,491 A | 9/1995 | Szajewski |
| 5,584,888 A | 12/1996 | Miracle |
| 5,679,661 A | 10/1997 | Willey |
| 5,697,230 A | 12/1997 | Ender |
| 5,834,412 A | 11/1998 | Rohrbaugh |
| 5,853,010 A | 12/1998 | Suh |
| 5,916,481 A | 6/1999 | Willey |
| 5,979,472 A | 11/1999 | Lowery et al. |
| 6,053,180 A | 4/2000 | Kwan |
| 6,150,494 A | 11/2000 | Wang |
| 6,262,005 B1 | 7/2001 | Willey et al. |
| 6,274,129 B1 | 8/2001 | Bhatt |
| 6,297,207 B1 | 10/2001 | Willey et al. |
| 6,339,055 B1 | 1/2002 | Brooker et al. |
| 6,524,529 B1 | 2/2003 | Horton, III |
| 6,593,286 B1 | 7/2003 | Kenney et al. |
| 7,081,225 B1 | 7/2006 | Hollander |
| 7,081,255 B2 | 7/2006 | Baert et al. |
| 7,384,903 B2 | 6/2008 | Masschelein et al. |
| 7,517,847 B2 | 4/2009 | Catalfamo |
| 7,595,290 B2 | 9/2009 | Pounds et al. |
| 7,604,012 B2 | 10/2009 | Alpert et al. |
| 7,700,196 B2 | 4/2010 | Ochs et al. |
| 7,897,104 B2 | 3/2011 | Kwon |
| 7,950,254 B2 | 5/2011 | Gray et al. |
| 7,971,457 B2 | 7/2011 | Aouad |
| 8,047,683 B2 | 11/2011 | Olesen et al. |
| 8,281,439 B2 | 10/2012 | Yusuf et al. |
| 8,631,972 B2 | 1/2014 | Kessler et al. |
| 8,758,606 B2 | 6/2014 | Tranchant |
| 9,587,209 B2 | 3/2017 | De Meirleir et al. |
| 9,694,383 B2 | 7/2017 | Jurcevic |
| 9,795,466 B2 | 10/2017 | Piergallini et al. |
| 9,834,740 B2 | 12/2017 | Willey et al. |
| 10,098,519 B2 | 10/2018 | Willey et al. |
| 2001/0003736 A1 | 6/2001 | Willey |
| 2001/0008879 A1 | 7/2001 | Willey |
| 2002/0032142 A1 | 3/2002 | Smets et al. |
| 2002/0045560 A1 | 4/2002 | Willey et al. |
| 2002/0077265 A1 | 6/2002 | Buzzacarini et al. |
| 2002/0122743 A1 | 9/2002 | Huang |
| 2002/0166779 A1 | 11/2002 | Etesse et al. |
| 2003/0050210 A1 | 3/2003 | Pounds et al. |
| 2003/0114333 A1 | 6/2003 | Somerville-roberts et al. |
| 2004/0147423 A1 | 7/2004 | Scialla et al. |
| 2004/0171505 A1 | 9/2004 | Nonami |
| 2004/0259023 A1 | 12/2004 | Campagnola |
| 2004/0259747 A1 | 12/2004 | Schmidt |
| 2004/0266648 A1 | 12/2004 | Willey |
| 2005/0009727 A1 | 1/2005 | Bettiol et al. |
| 2005/0043205 A1 | 2/2005 | Bettiol et al. |
| 2005/0126609 A1 | 6/2005 | Son |
| 2005/0150528 A1 | 7/2005 | Kim |
| 2005/0155633 A1 | 7/2005 | Daume |
| 2005/0288200 A1 | 12/2005 | Willey et al. |
| 2006/0097222 A1 | 5/2006 | Doona |
| 2007/0000068 A1 | 1/2007 | Gerard |
| 2007/0129520 A1 | 6/2007 | Ochs |
| 2007/0214577 A1 | 9/2007 | Bianchetti |
| 2007/0266502 A1 | 11/2007 | Resta et al. |
| 2008/0108537 A1 | 5/2008 | Rees |
| 2008/0128818 A1 | 6/2008 | Chen |
| 2008/0255498 A1 | 10/2008 | Houle |
| 2009/0000040 A1 | 1/2009 | Ikemizu |
| 2009/0090387 A1 | 4/2009 | Massey |
| 2009/0145452 A1 | 6/2009 | Anderson |
| 2009/0170744 A1 | 7/2009 | Meine |
| 2009/0181874 A1 | 7/2009 | Souter et al. |
| 2009/0194474 A1 | 8/2009 | Tranchant |
| 2010/0025226 A1 | 2/2010 | Callerame |
| 2010/0031450 A1 | 2/2010 | Wattebled et al. |
| 2010/0132131 A1 | 6/2010 | Souter et al. |
| 2010/0200026 A1 | 8/2010 | Boztas et al. |
| 2010/0216679 A1 | 8/2010 | Batchelor et al. |
| 2010/0216687 A1 | 8/2010 | Hunter et al. |
| 2011/0044848 A1 | 2/2011 | Wright |
| 2011/0057123 A1 | 3/2011 | Ho |
| 2011/0110817 A1 | 5/2011 | Lupo |
| 2011/0180118 A1 | 7/2011 | Schrott |
| 2011/0188784 A1 | 8/2011 | Denome |
| 2011/0215689 A1 | 9/2011 | Wegener |
| 2011/0217202 A1 | 9/2011 | Winterton |
| 2011/0315709 A1 | 12/2011 | Fileccia |
| 2012/0055513 A1 | 3/2012 | Eglmeier |
| 2012/0093905 A1 | 4/2012 | Batchelor |
| 2012/0285991 A1 | 11/2012 | Muller |
| 2013/0032610 A1 | 2/2013 | Muller |
| 2013/0288942 A1 | 10/2013 | Stenger |
| 2014/0084024 A1 | 3/2014 | Benda |
| 2014/0142302 A1 | 5/2014 | Furuyama |
| 2014/0162931 A1 | 6/2014 | De Meirleir |
| 2014/0166829 A1 | 6/2014 | Thompson |
| 2015/0119789 A1 | 4/2015 | Loupis et al. |
| 2015/0208898 A1 | 7/2015 | Willey et al. |
| 2015/0209808 A1 | 7/2015 | Watson |
| 2015/0210964 A1 | 7/2015 | Willey et al. |
| 2015/0211170 A1 | 7/2015 | Willey et al. |
| 2016/0107904 A1 | 4/2016 | Rajagopalan et al. |

FOREIGN PATENT DOCUMENTS

| | | |
|---|---|---|
| CN | 201546059 U | 8/2010 |
| CN | 205152628 U | 4/2016 |
| CN | 105960190 A | 9/2016 |
| CN | 107044032 A | 8/2017 |
| DE | 2335570 A1 | 1/1974 |
| DE | 4337186 A1 | 5/1995 |
| DE | 102010030046 A1 | 2/2011 |
| DE | 202012102250 U1 | 9/2012 |
| EP | 0038590 A2 | 10/1981 |
| EP | 0368680 A1 | 5/1990 |
| EP | 0605038 A1 | 7/1994 |
| EP | 2366323 A1 | 9/2011 |
| EP | 2113605 B1 | 11/2013 |
| EP | 2924104 A1 | 9/2015 |
| EP | 3138898 A1 | 3/2017 |

(56) References Cited

FOREIGN PATENT DOCUMENTS

| | | | |
|---|---|---|---|
| EP | 3138899 | A1 | 3/2017 |
| GB | 1372036 | A | 10/1974 |
| JP | S591380 | U | 1/1984 |
| JP | S59164399 | A | 9/1984 |
| JP | S61197698 | A | 9/1986 |
| JP | H0617663 | U | 3/1994 |
| JP | H0713669 | Y2 | 4/1995 |
| JP | 2542215 | Y2 | 7/1997 |
| JP | H11123299 | A | 5/1999 |
| JP | 2000225087 | A | 8/2000 |
| JP | 2003093481 | A | 4/2003 |
| JP | 2005211545 | A | 8/2005 |
| JP | 3129855 | B2 | 2/2007 |
| JP | 2008086717 | A | 4/2008 |
| JP | 2008178721 | A | 8/2008 |
| JP | 2010132759 | A | 6/2010 |
| JP | 2010136739 | A | 6/2010 |
| JP | 2010520352 | A | 6/2010 |
| JP | 2011078662 | A | 4/2011 |
| JP | 2011224208 | A | 11/2011 |
| JP | 2013188331 | A | 9/2013 |
| JP | 2016525906 | A | 9/2016 |
| JP | 2017510318 | A | 4/2017 |
| KR | 20070082389 | A | 8/2007 |
| KR | 20100011707 | A | 2/2010 |
| KR | 20110135845 | A * | 12/2011 |
| WO | 9749664 | A1 | 12/1997 |
| WO | 9859030 | A1 | 12/1998 |
| WO | 9938489 | A1 | 8/1999 |
| WO | 0002982 | A2 | 1/2000 |
| WO | 0028874 | A2 | 5/2000 |
| WO | 0042145 | A1 | 7/2000 |
| WO | 0042146 | A1 | 7/2000 |
| WO | 0042155 | A1 | 7/2000 |
| WO | 0042157 | A1 | 7/2000 |
| WO | 0104247 | A1 | 1/2001 |
| WO | 0107549 | A1 | 2/2001 |
| WO | 0112766 | A1 | 2/2001 |
| WO | 0236722 | A1 | 5/2002 |
| WO | 2006055787 | A1 | 5/2006 |
| WO | 2007087259 | A2 | 8/2007 |
| WO | 2007116747 | A1 | 10/2007 |
| WO | 2007134224 | A2 | 11/2007 |
| WO | 2008052975 | A2 | 5/2008 |
| WO | 2008065062 | A1 | 6/2008 |
| WO | 2008128817 | A1 | 10/2008 |
| WO | 2010051808 | A2 | 5/2010 |
| WO | 2010051906 | A1 | 5/2010 |
| WO | 2010099997 | A1 | 9/2010 |
| WO | 2012032283 | A1 | 3/2012 |
| WO | 2012126537 | A1 | 9/2012 |
| WO | 2018086871 | A1 | 5/2018 |
| WO | WO-2019120343 | A1 * | 6/2019 ............ A61L 2/10 |

OTHER PUBLICATIONS

Machine Translation of WO-2019120343-A1, Hohne, Jun. 2019. (Year: 2019).*
Machine Translation of KR20110135845A, Rim, Dec. 2011. (Year: 2011).*
International Search Report; International Application No. PCT/US2019/035291; date of mailing Oct. 16, 2019; 28 pages.
Akat, H. et al., "Poly(ethyele glycol)-thioxanthone prepared by Diels-Alder clickchemistry as one-component polymeric photoinitiator for aqueous free-radicalpolymerization", Journal of Polymer Science, Part A: Polymer Chemistry, vol. 48,2109-2114 (2010).
Allen et al., "Photochemistry of thioxanthones-III. Spectroscopic and flash photolysis study on hydroxy and methoxy derivatives", In European polymer journal, vol. 22, Issue 9, Jan. 1, 1986, pp. 691-697.
Corrales et al.,"Novel water soluble copolymers based on thioxanthone: photochemistry and photoinitiation activity", In Journal of Photochemistry and Photobiology A: Chemistry, vol. 169, Issue 1, Jan. 1, 2005, pp. 95-100.
Corrales et al., Journal of Photochemistry and Photobiology A: Chemistry, "Freeradical macrophotoinitiators: an overview on recent advances", 2003, 159, pp. 103-114.
F. Zaragoza Dorwald, "Side Reactions in Organic Synthesis", 2005, WILEY-VCH Verlag GmbH & Co. KGaA, Weinheim, Preface. p. IX.
Okubayashi et al., Journal of Applied Polymer Science, "Improvement of Wettability of Hydrophobic Films by Impregnation of Anthraquinone Attached to Polyoxyethylene Glycol", 2005, vol. 97, pp. 545-549.

* cited by examiner

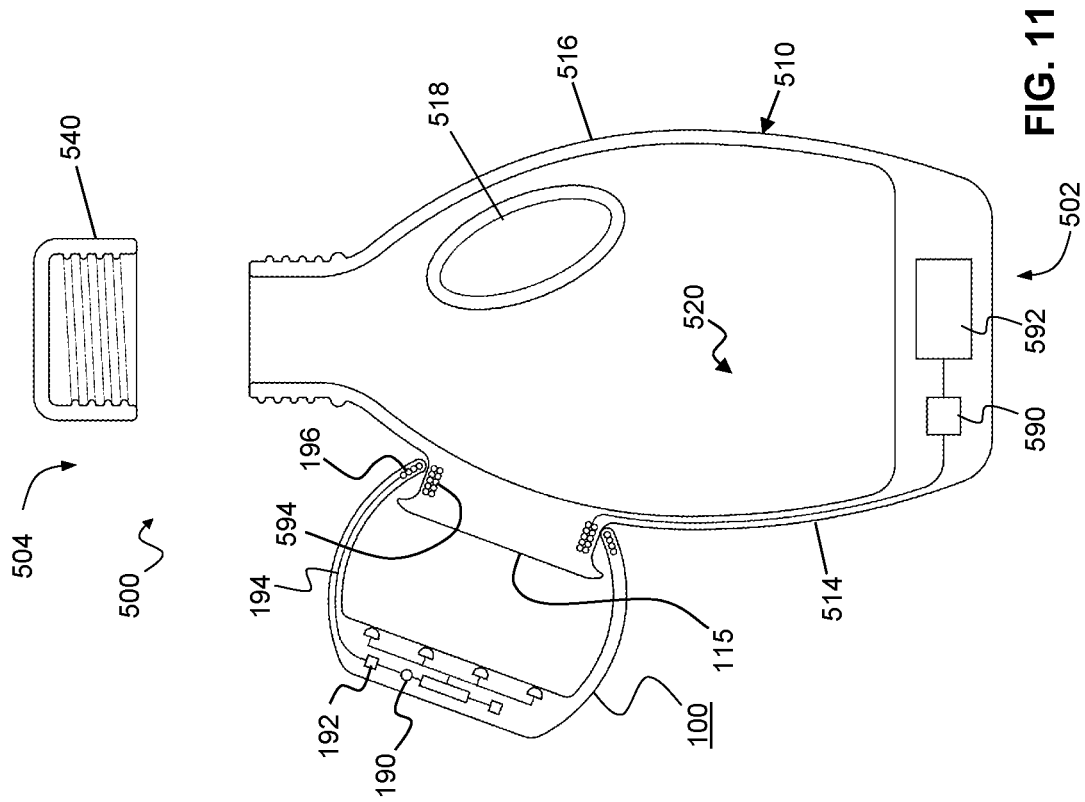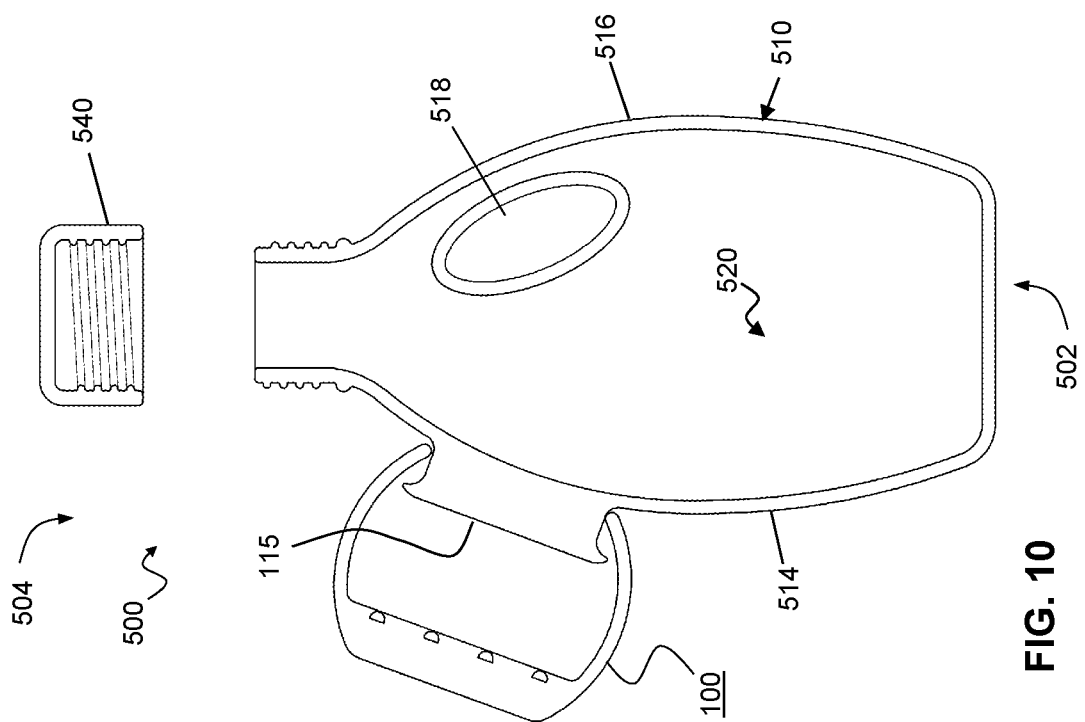

PHOTOACTIVATING DEVICE FOR WASHING MACHINE

FIELD OF THE INVENTION

Photoactivating device for activation of one or more photoactive components contained in a laundry treatment composition for placement within a laundering space of a washing machine, optionally wherein the photoactivating device has photoactivating capability.

BACKGROUND TO THE INVENTION

The benefits of using photoactive components within a laundry treatment composition have been described in the art, for instance, an improvement to stain removal, and for the elimination of micro-organism such as bacteria and spores.

A problem in the art is an effective and even activation of the photoactive component within the wash solvent (e.g. water). When an activating light source is provided as a fixed arrangement within the washing machine, it will activate photoactive component only in the vicinity of the fixed source, meaning that the laundry articles and wash solvent (e.g. water) need to be thoroughly agitated to ensure an even exposure to the light source.

A further problem in the art is local effects of photoactivation products such as bleaching; where the light source shines for too long or too intensely, laundry articles too close to the light source may become whitened locally, causing patches of discolouration or brightening, notable in particular for coloured laundry articles.

A further problem of the art is a controlled release of the photoactivation products. Photoactivation products have a short life, accordingly, photoactivation need to be controlled for a slow release in order to work simultaneously with or in synergy with other components in the laundry treatment composition.

A further problem of the art is how to introduce the benefits of photoactive components to older washing machines, or washing machines without a suitable light source.

It is an aim of the present invention to provide devices, kits and methods to overcome the problems of the art.

SUMMARY OF SOME EMBODIMENTS

Provided herein is a photoactivating device (100) for deployment in a washing machine for activating one or more photoactive components in a laundry treatment composition, comprising:
  a light source (160) configured for emission of light for activation of the one or more photoactive components,
  a controller (180), and
  a switch and/or a motion sensing unit (170), wherein the controller (180) is configured to control the light source (160) responsive to the switch and/or signals received from the motion sensing unit (170), and
  optionally wherein photoactivating device (100) further comprises:
    a body (110) defining a cavity (120) for receiving and retaining the laundry treatment composition, and
    an opening (130) to the cavity (120) configured for receiving the laundry treatment composition.

Further provided herein is a photoactivating device (100) for deployment in a washing machine for holding a laundry treatment composition comprising one or more photoactive components, comprising:
  a body (110) defining a cavity (120) for receiving and retaining the laundry treatment composition,
  an opening (130) to the cavity (120) configured for receiving the laundry treatment composition, and
  a light source (160) configured for emission of light for activation of the one or more photoactive components,
optionally wherein:
  the photoactivating device (100) further comprises:
    a controller (180), and
    a switch and/or a motion sensing unit (170), wherein the controller (180) is configured to control the light source (160) responsive to the switch and/or signals received from the motion sensing unit (170).

The controller (180) may be configured to control the light source (160) responsive to signals received from the motion sensing unit (170) indicative of a fixed position and/or orientation of the photoactivating device (100) relative to one or more laundry articles in the washing machine, optionally wherein the controller (180) is configured to reduce light emitted by the light source (160) responsive to a centrifugal acceleration measured by the motion sensing unit (170) of at least 20 m/s$^2$.

The controller (180) may be configured to reduce light emitted by the light source (160) when signals of motion sensing unit (170) correspond to a period of non-activation of a washing machine agitation unit configured to induce movement of the laundry articles.

The controller (180) may be configured to reduce light emitted by the light source (160) when signals of motion sensing unit (170) correspond to:
  a movement of the photoactivating device (100) being synchronised with a movements of a washing machine agitation unit configured to induce movement of the laundry article and the photoactivating device (100), optionally wherein a centrifugal acceleration measured by the motion sensing unit (170) is constant,
or
  a spin cycle of the washing machine, optionally wherein a centrifugal acceleration measured by the motion sensing unit (170) is at least 80 m/sec$^2$.

The motion sensing unit (170) may comprise one or more accelerometers and/or one or more orientation sensors.

The light source (160) may comprise a plurality of light emitting diodes, LEDs, wherein at least some of the LEDs are internal emitters (160a) arranged to emit light into the cavity (120).

The light source (160) may comprise a plurality of light emitting diodes, LEDs, wherein at least some of the LEDs are external emitters (160b) arranged to emit light into an exterior space.

At least one of the external emitters (160b) may be disposed in a region, a PT region (162), occupying ≤50% of the outside surface of the photoactivating device (100), optionally in a base (112) of the photoactivating device (100).

The photoactivating device (100) may further comprises a power source (190), optionally wherein the power source (190) comprises a non-rechargeable, battery, a rechargeable battery, a capacitor, an inductive coil, or a dynamo.

The light source (160) comprises at least 2 LEDs each emitting light of a different wavelength range.

Further provided herein is a kit comprising:
  a photoactivating device (100) for deployment in a washing machine for activating one or more photoactive components in a laundry treatment composition, comprising:

a light source (160) configured for emission of light for activation of the one or more photoactive components, optionally wherein photoactivating device (100) further comprises:

a body (110) defining a cavity (120) for receiving and retaining the laundry treatment composition, and an opening (130) to the cavity (120) configured for receiving the laundry treatment composition, and further comprising:

a container unit (500) for storage and dispensing of the laundry treatment composition comprising one or more photoactive components, and/or the laundry treatment composition comprising one or more photoactive components, optionally contained within the container unit (500).

The photoactivating device (100) is the photoactivating device (100) as described herein.

The one or more photoactive components may be selected from riboflavin, phloxine B, erythrosine, or salts thereof.

The container unit (500) may comprise a coupling element (115, 538) configured for dismountable repeatable attachment of the photoactivating device (100) to the container unit (500).

The container unit (500) may be disposed with a container power source (592) and an induction coil (594) disposed operatively with respect to the coupling element (115, 538), and is configured for charging a rechargeable power source (190) of the photoactivating device (100) attached to the coupling element (115, 538).

DESCRIPTION OF THE DRAWINGS

FIG. 10 shows a cross-sectional view of a container unit provided with a cap and a photoactivating device dismountably attached to a side projection.

FIG. 11 shows a cross-sectional view of a container unit of FIG. 10 provided with an inductive charging assembly, and a photoactivating device dismountably attached to a side projection.

DETAILED DESCRIPTION OF THE INVENTION

Figure 1:
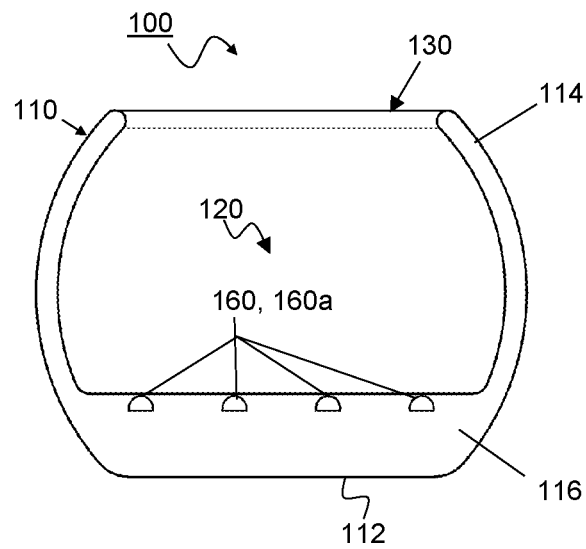
FIGS. 1 and 2 show a cross-sectional view of a photoactivating device as described herein
Figure 2:
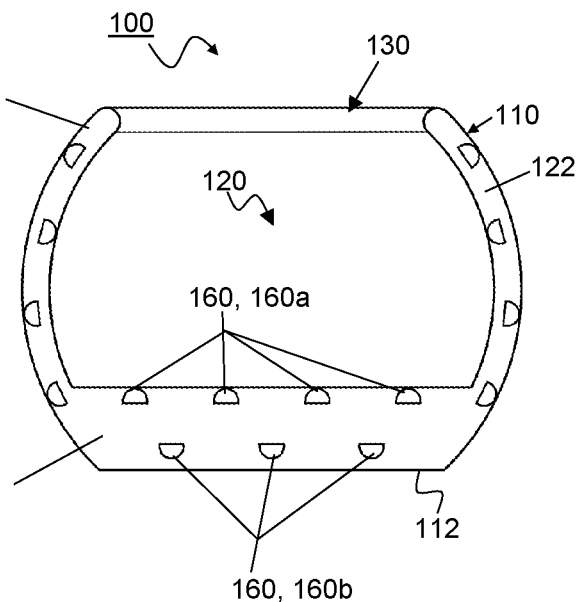
Figure 3:
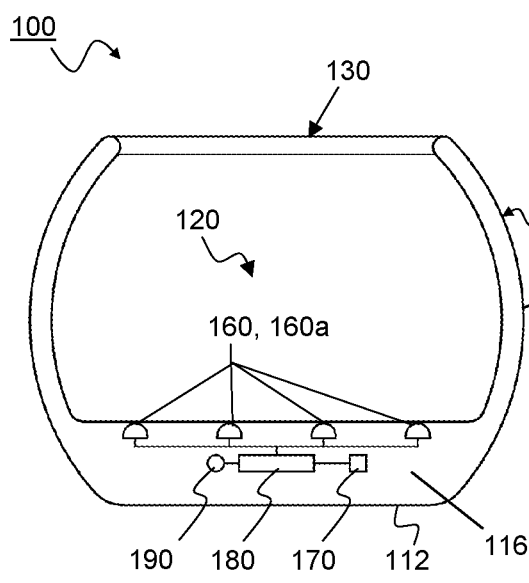
FIG. 3 shows a cross-sectional view of a photoactivating device as described herein, disposed with an opening to the cavity, a motion sensing unit and controller.
Figure 4:
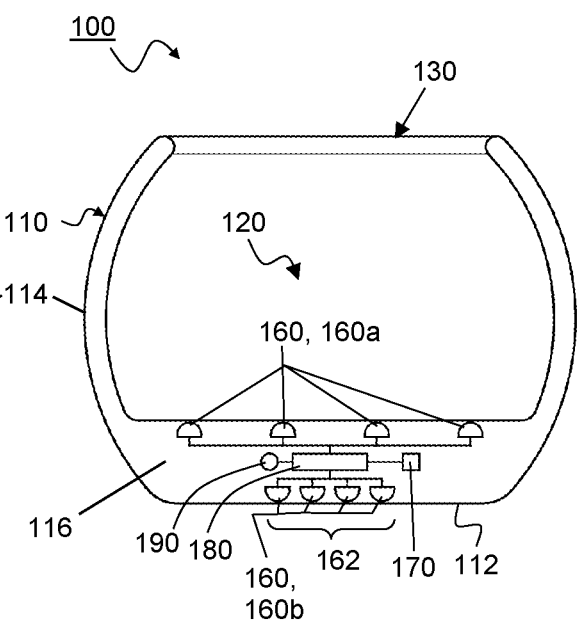
FIG. 4 shows a cross-sectional view of a photoactivating device as described herein, disposed with an opening to the cavity, a motion sensing unit and controller, and a pre-treatment (PT) region.

Before the present device, kit and method of the invention are described, it is to be understood that this invention is not limited to particular devices, kits and methods or combinations described, since such devices, kits and method and combinations may, of course, vary. It is also to be understood that the terminology used herein is not intended to be limiting, since the scope of the present invention will be limited only by the appended claims.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

The recitation of numerical ranges by endpoints includes all numbers and fractions subsumed within the respective ranges, as well as the recited endpoints.

The term "about" or "approximately" as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" or "approximately" refers is itself also specifically, and preferably, disclosed.

Whereas the terms "one or more" or "at least one", such as one or more or at least one member(s) of a group of members, is clear per se, by means of further exemplification, the term encompasses inter alia a reference to any one of said members, or to any two or more of said members, such as, e.g., any ≥3, ≥4, ≥5, ≥6 or ≥7 etc. of said members, and up to all said members.

All references cited in the present specification are hereby incorporated by reference in their entirety. In particular, the teachings of all references herein specifically referred to are incorporated by reference.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the appended claims, any of the claimed embodiments can be used in any combination.

In the present description of the invention, reference is made to the accompanying drawings that form a part hereof, and in which are shown by way of illustration only of specific embodiments in which the invention may be practiced. Parenthesized or emboldened reference numerals affixed to respective elements merely exemplify the elements by way of example, with which it is not intended to limit the respective elements. It is to be understood that other embodiments may be utilised and structural or logical changes may be made without departing from the scope of the present invention. The following detailed description, therefore, is not to be taken in a limiting sense, and the scope of the present invention is defined by the appended claims.

Provided herein is a photoactivating device for deployment in a washing machine for laundering of one or more laundry articles. The photoactivating device is configured for removable deployment or placement within a laundering space of the washing machine. The laundering space is disposed in relation to an agitation unit configured to induce movement of the laundry articles. Forces provided by the agitation unit are conferred to the photoactivating device, thereby causing temporal movement of the photoactivating device in relation to one or more laundry articles. The photoactivating device is provided with a light source configured for emission of light for activation of the one or more photoactive components. As the photoactivating device is induced to move through the laundering space, a thorough activation of the one or more photoactive components is achieved compared with a fixed external irritating light source. The photoactivating device retrofits a light activating capacity to any washing machine.

The photoactivating device is configured for placement within a laundering space of the washing machine. The laundering space holds the fabrics to be laundered, and can be at least partially filled with laundering solvent (e.g. water) and typically disposed in relation to an agitation unit configured to induce movement to the laundry articles. The laundering space of an automatic washing machine typically comprises an interior of a drum, wherein the agitation unit is provided by a revolute disposition of the drum. The washing machine may be a front or top loader. Another example of a laundering space is a cylindrical or cuboid space where the agitation unit comprises a rotating paddle, agitator, or one or more water jets which provide agitation.

The photoactivating device (100) as illustrated for instance in FIG. 1 comprises a body (110) disposed with a light source (160). The light source (160) is configured for emission of light for activation of the one or more photoactive components. The body (110) may have an overall rounded shape such a sphere, oval sphere, rounded cuboid; it assists with movement between laundry articles through the laundering space of the washing machine and amongst the laundry articles with reduced resistance. The exterior surface of the body (110) may be smooth to reduce friction; it may optionally be coated with a friction-reducing substance such as those containing polytetrafluoroethylene (PTFE) or Teflon.

The body (110) of the photoactivating device (100) may comprise a wall. The wall may be curved. The wall may be curved as to form a sphere, or oval sphere, or other rounded shape. The light source is disposed within the wall so as to emit light outwards from the wall.

The body (110) of the photoactivating device (100) may comprise a base (112) and side wall (114) extending from the base (112), typically in an upwards direction. The base (112) may have a round or oval profile or a profile or another geometric shape. The base (112) may be essentially flat. The side wall (114) may be curved. The side wall (114) may be curved to as to form a dome or other rounded shape. The overall shape of the photoactivating device (100) may be spherical or oval ball; it assists with movement between laundry articles through the laundering space of the washing machine.

The body (110) of the photoactivating device (100) may define a cavity (120). The cavity (120) may be empty. The cavity (120) may be provided with an inert substance (e.g. a polymeric material) to increase weight and/or alter a centre of gravity of the photoactivating device (100). The body (110) may be provided with one or more venting ports (118) to allow flooding and/or drainage of the cavity (120) with wash solvent (e.g. water) or with photoactive components in solution or suspension in the wash solvent. The body (110) may be provided with an opening (130) to the cavity (120) for passage, preferably by pouring therein, of the laundry treatment composition (see later below).

The photoactivating device (100) is dimensioned to fit within the laundering space of the washing machine. The photoactivating device (100) is portable; it can be used in any washing machine. The photoactivating device (100) is autonomous.

The body (110) may be formed from one or more polymeric material including, for instance, polypropylene, polycarbonate.

The photoactivating device (100) as illustrated for instance in FIGS. 1 to 4 comprises a body (110) defining a cavity (120) for receiving the laundry treatment composition. It further comprises an opening (130) to the cavity (120). The opening (130) may be round or oval or other geometric shape. The laundry treatment composition may enter the cavity (120) through the opening (130). The opening (130) is configured for receiving, preferably by pouring therein, the laundry treatment composition. Through the same opening (130), the laundry treatment composition may exit the cavity (120) during the wash cycle. The opening (130) is configured for outward passage of the laundry treatment composition. The cavity (120) allows delivery of a dose of laundry treatment composition to the laundering space. The cavity (120) may be configured to retain the laundry treatment composition when the photoactivating device (100) rests on its base (112). By defining a volume of the cavity, the correct dose can be delivered to the laundering space. The cavity (120) may have a volume of 10 cm$^3$ to 300 cm$^3$.

Figure 5:
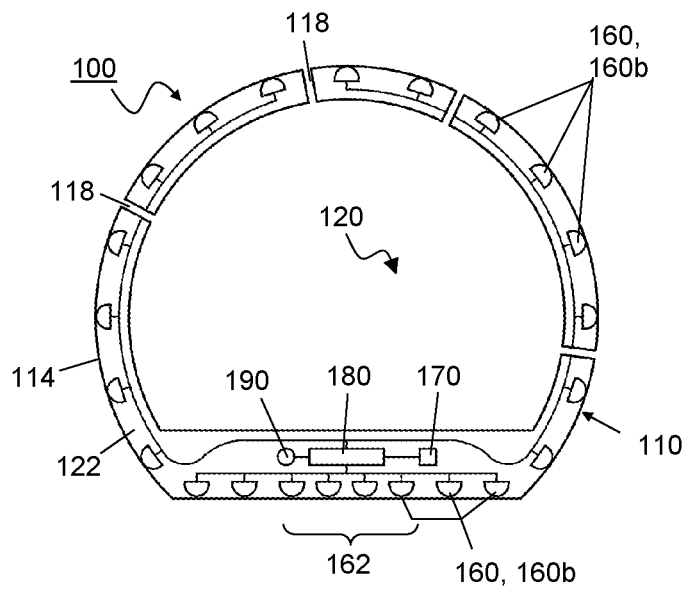
FIG. 5 shows a cross-sectional view of a photoactivating device as described herein, disposed with vents to the cavity, a motion sensing unit and controller, and a pre-treatment (PT) region.
Figure 6:
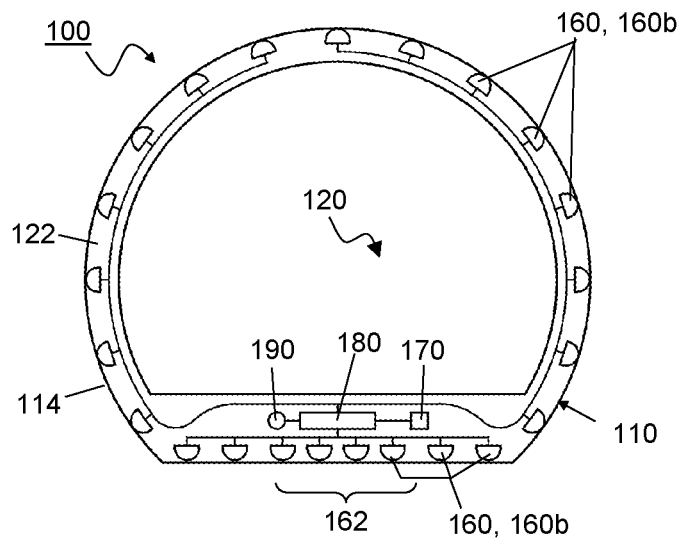
FIG. 6 shows a cross-sectional view of a photoactivating device as described herein, disposed with a motion sensing unit and controller, and a pre-treatment (PT) region.
Figure 7:
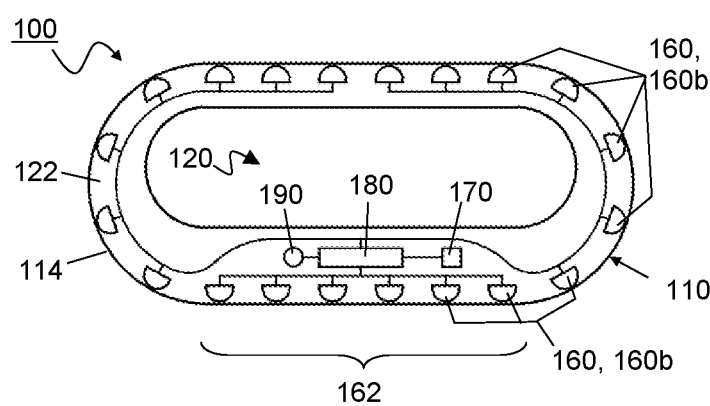
FIG. 7 shows a cross-sectional view of a different form of the photoactivating device as described herein.
Figure 9:
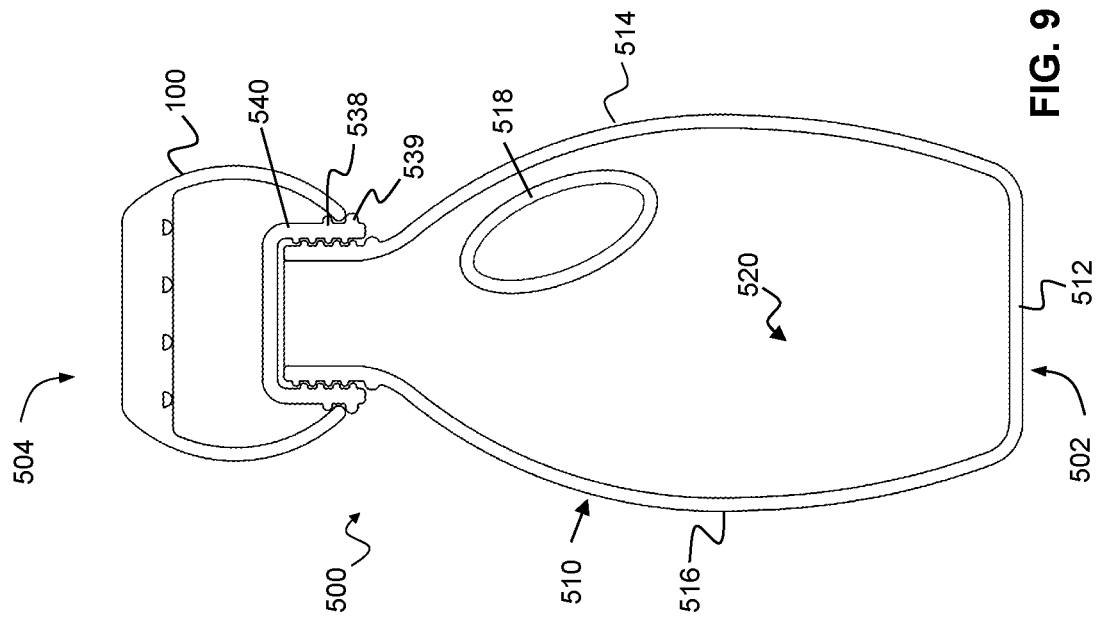
FIG. 9 shows a cross-sectional view of a container unit and a photoactivating device dismountably attached to the cap.

The photoactivating device (100) as illustrated for instance in FIGS. 5 to 7 comprises a body (110) defining a cavity (120). The cavity (120) may be empty or provided with ballast (e.g. FIGS. 6, 7) to allow the photoactivating device (100) to sink. The body may be provided with one or a plurality of venting ports (118) allowing the cavity to be flooded with wash solvent (e.g. water) which also provides ballast. Through the same venting port (118), wash solvent (e.g. water) may exit the cavity (120) during the wash cycle. The photoactivating device (100) may be devoid of an opening.

The photoactivating device (100) is further provided with a light source (160) configured for emission of light for activation of the light-activating agent. The light source may comprise one or more light emitting diodes, LEDs. The LEDs are preferably heat resistant so as to withstand temperatures typically encountered in a wash cycle (e.g. 30 deg C. to 90 deg C.).

The light source (160) may comprise a plurality of LEDs, wherein light emitted from all the LEDs in the plurality of the same wavelength range. The light source (160) may comprise a plurality of LEDs, wherein light emitted from at least 2 of the plurality is of a different wavelength range. The light source (160) may be disposed within the body (110) in the base (112) and/or side wall (114) of the photoactivating device (100), optionally within a void space (116, 122) therein.

Where there is a plurality of LEDs, they may be driven by multiplexing (fast sequential switching) in order to control intensities individually or in groups, and to reduce power consumption.

The light source (160) may comprises a plurality of LEDs, wherein at least one (e.g. 1, 2 or more) of the plurality are internal emitters (160a) arranged to emit light into the cavity (120), as shown for instance in FIGS. 1 to 4. The internal emitters (160a) may be disposed within the body (110) in the base (112) and/or side wall (114) of the photoactivating device (100), optionally within a void space (116, 122) therein.

The internal emitters (160a) may be disposed in a region of the base (112), and/or in a region of the side wall (114). The internal emitters (160a) activate the one or more photoactive components contained in the cavity (120). They activate one or more photoactive components in solution or suspension with the laundering solvent (e.g. water) which momentarily enters the cavity (120) during the course of the wash cycle. Internal emitters (160a) may be distributed around the base (112) and/or side wall (114) at a density of at least 1 internal emitter (160a) per 2 cm². The internal emitters (160a) may be provided when the body (110) is disposed with an opening (130) or venting port (118) thereby allowing activation of the one or more photoactive components in the laundry treatment composition while it is retained in the cavity (120) at least during initial stages of the wash cycle.

The light source (160) may comprises a plurality of LEDs, wherein at least one (e.g. 1, 2 or more) of the plurality are external emitters (160b) arranged to emit light into an exterior space e.g. outside the cavity (120), as shown for instance in FIGS. 2, 4, 5 to 7. The external emitters (160b) may be disposed within the body (110) in the base (112) and/or side wall (114) of the photoactivating device (100), optionally within a void space (116, 122) therein.

The external emitters (160b) may be disposed in a region of the base (112), and/or in a region of the side wall (114). The external emitters (160b) activate the one or more photoactive components in solution or suspension with the laundering solvent (e.g. water) during the course of the wash cycle. The external emitters (160b) may be distributed around the base (112) and/or side wall (114) at a density of at least 1 internal emitter (160a) per 2 cm².

All or a proportion of the external emitters (160b) may be disposed in a region of the body (110) known as a pre-treatment (PT) region (162), for instance in the base (112) as shown for instance in FIGS. 4 to 7. The PT region (162) may occupy ≤50% of the outside surface of the photoactivating device (100). The external emitters (160b) in the PT region (162) allow activation by manual application of light to the one or more photoactive components when the laundry treatment composition has been applied directly the laundry article. Where a user wishes to pre-treat the laundry article, for instance, where the article is heavily stained, an aliquot of laundry treatment composition can be applied to the laundry article prior to laundering in the washing machine. The photoactivating device (100), in particular the PT region (162), can be swiped across the area of application, and light emitted by the external emitters (160b) illuminated in the PT region activates the one or more photoactive components. A motion sensing unit (see later below) may detect a swiping motion of the photoactivating device (100) and temporarily activate the external emitters (160b) selectively in the PT region (162).

The light source (160) may emit light at one wavelength range, or a two or more different wavelength ranges. The wavelength range may be selected based on the one or more photoactive components present in the laundry treatment composition. The light absorption profile of a photoactive component may at least partially overlap with the light emission profile of the light source. The wavelength range of the light source (160) may be in the visible, or UV range, or a combination of both. The wavelength range of the light source (160) may be selected from the spectrum range 250 nm to 750 nm. The wavelength range may correspond to ultraviolet (~350-380 nm), violet (~380-450 nm), blue (~450-495 nm), green (~495-570 nm), yellow (~570-590 nm), orange (~590-620 nm), or red (~620-750 nm) light. Table 1 below indicates exemplary emission ranges of the light source suited to activate various photoactive components.

TABLE 1

Photoactive components and exemplary suited light source wave lengths

| Photoactive component | Light source wavelength range |
| --- | --- |
| Riboflavin | 410-480 nm |
| Phloxine B | 500-600 nm |
| Erythrosine | 500-550 nm |

A wavelength range corresponding to UV (~350-400 nm), blue (400-495 nm) or red light (600-700 nm) is preferred.

The photoactivating device (100) may be further provided with a motion sensing unit (170) configured to detect movements of the photoactivating device (100) in one or more degrees of freedom (DOF), as shown, for instance, in FIGS. 3 to 7. The motion sensing unit (170) outputs signals responsive to the movements of the photoactivating device (100). The motion sensing unit (170) may detect rotational and/or displacement movements. The rotational movements may have 3DOF. The displacement movements may have 3DOF. The motion sensing unit (170) may comprise an accelerometer configured for detection of motion along at least 1 (1DOF), preferably 3 (3DOF) linear axis and/or around at least 1 (1DOF), preferably 3 (3DOF) rotational axis. The motion sensing unit (170) may comprise an orientation sensor (e.g. gyroscope, compass) configured for measurement of orientation or change of orientation of the photoactivating device (100). A gyroscope typically measures an angular rate of rotational movement about at least 1 (1DOF), preferably 3 (3DOF) rotational axis. The motion sensing unit (170) may comprise both an accelerometer and an orientation sensor.

The motion sensing unit (170) may be attached in fixed (i.e. position and orientation) relation to the photoactivating device (100) or to the body (110) thereof.

The motion sensing unit (170) may be disposed within the body (110) in the base (112) of the photoactivating device (100), optionally within a void space (116) therein. The motion sensing unit (170) may be disposed within the body (110) in the side wall (114) of the photoactivating device (100), optionally within a void space (122) therein.

The motion sensing unit (170) may detect from movements of the photoactivating device (100), when the photoactivating device (100) is in a fixed position and/or orientation relative to a laundry article, optionally when the agitation unit is activated e.g. when the drum is revolving at the same time for instance during agitation or during a spin cycle. The motion sensing unit (170) can detect from movements of the photoactivating device (100), when a wash cycle has started and/or completed.

The photoactivating device (100) may further comprise a controller (180) configured to control the light source (160) preferably responsive to signals received from the motion sensing unit (170), as shown, for instance, in FIGS. 3 to 7. The controller (180) may be configured to control the light source (160) preferably responsive to a switch. The photoactivating device (100) may further comprise the controller (180) together with a switch and/or a motion sensing unit (170). The controller (180) typically comprises an electronic circuit. The electronic circuit may comprise a processor and memory. By controlling the light source it means one or more of controlling an intensity, an illumination pattern (e.g. steady or flashing), whether or it is illuminated or extinguished. Where the light source (160) comprises a plurality of LEDs, it may control which LEDs are illuminated or extinguished, an intensity, an illumination pattern (e.g. steady or flashing) of a subset of the LEDs. The controller may be configured to drive the plurality of LEDs by multiplexing. The LEDs that are controlled by the controller (180) may be internal emitters (160a) and/or external emitters (160b). The controller (180) may selectively control the external emitters (160b) disposed in the pre-treatment region.

The controller (180) may be configured to control the light source (160) responsive to a switch. The switch may be a momentary contact switch or a maintained switch. The controller (180) may be configured to turn the light source on or off in response to the switch. The controller (180) may be configured to control the light source according to a sequence of pre-set time periods corresponding to a wash cycle, that is initiated by the switch. In one example, the controller may illumine the light source (160) 10 minutes after the switch has been activated, maintain illumination for a duration of the active wash cycle (e.g. 90 to 120 minutes), then extinguish the light source (160).

The controller (180) may be configured to control the light source (160) responsive to a switch and/or a motion sensing unit (170).

The controller (180) may be configured to detect from the signals from the motion sensing unit (170) a start and/or completion of a wash cycle of the washing machine. The controller (180) may be configured to control light emitted by the light source (160) when signals of the motion sensing unit (170) correspond to a start, duration or end of the wash cycle. The LEDs that are controlled by the controller (180) may be external emitters (160a) and/or external emitters (160b).

The controller (180) may be configured to:
- reduce light emitted by the light source (160) or set the light emitted by the light source (160) to a low (L) setting, or
- increase light emitted by the light source (160) or set the light emitted by the light source (160) to a normal (N) setting, depending on signals received from the motion sensor during an active wash cycle.

The light emission reduction or the low (L) setting may correspond to an overall dimming and/or, an overall extinguishing of emitted light, and/or a light source emission level that is lower than the normal (N) setting. The dimming may be achieved by reducing voltage (steady or within a time period) supplied to the light source, or extinguishing one or more LEDs thereby achieving an overall dimming effect. The LEDs that contribute to the light emission decrease or low (L) setting may be internal emitters (160a) and/or external emitters (160b). In the low (L) setting, the photoactivating device (100) may emit insufficient light to active the one or more photoactive components in the laundry treatment composition present in the cavity (120) and/or in the washing solvent (e.g. water).

The light emission increase or normal (N) setting may correspond to an overall increase of emitted light, and/or a pre-defined light source emission level that is higher than the low (L) setting. In the normal (N) setting, the photoactivating device can active the one or more photoactive components in the laundry treatment composition present in the cavity (120) and/or in the washing solvent (e.g. water). The increase may be achieved by increasing voltage supplied (steady or within a time period) to the light source, or re-illuminating one or more LEDs thereby achieving an overall more light emission. The LEDs that contribute to the light emission increase or normal (N) setting may be internal emitters (160a) and/or external emitters (160b). In the normal (N) setting, the photoactivating device (100) may emit sufficient light to activate the one or more photoactive components in the laundry treatment composition present in the cavity (120) and/or in the washing solvent (e.g. water).

The normal (N) setting may have different intensities depending on the extent of motion determined from signals received from the motion sensing unit (170). For instance N1 may be a maximum intensity during agitation (A), while N2 may a lower intensity but still more intense than emission in a (L) setting; the N2 setting may be applied during rest (R).

The controller (180) may be configured to control the light source (160) responsive to signals received from the motion sensing unit (170) that are indicative of an active wash cycle and a fixed position and/or orientation (linear and angular) of the photoactivating device (100) relative to one or more laundry articles in the washing machine during an active wash cycle. Preferably the controller (180) is configured to reduce light emitted by the light source (160), or set the light emitted by the light source (160) to a low (L) setting in such case.

During an active wash cycle, light emission may be at a constant intensity, or may increase or decrease depending on a phase of the wash cycle or upon a fixed positional/rotational relation of the photoactivating device with a laundry article (see later below).

During an active wash cycle, the controller may be configured to set the light emitted by the light source (160) to a low (L) or normal (N) setting depending on the movement of the photoactivating device (100) indicated by the signals of the motion sensing unit (170). The controller (180) may be configured to reduce light emitted by the light source (160) or set the light emitted by the light source (160) to a low (L) setting when signals of the motion sensing unit (170) correspond to a period (e.g. period $t_{rest}$) of non-activation of the agitation unit, for instance, when the washing drum, paddle, or agitation is static during an active wash cycle.

The controller (180) may be configured to increase light emitted by the light source (160) or set the light emitted by the light source (160) to a normal (N) setting when signals of the motion sensing unit (170) correspond to a period (e.g. period $t_{agitation}$) of activation of the agitation unit, for instance, when the washing drum, paddle, or agitation is active during an active wash cycle.

By controlling the light source (160) according the movements of the motion sensing unit (170) in relation to a laundry article, local over-bleaching of laundry articles is reduced or prevented. The photoactivating device (100) is suitable for a wash cycle of any degree of mechanical agitation, where the period of rest and agitation are not known. The release of photoactivated products is more slow, allowing other agents in the laundry treatment composition to have an effect prior to or during activation.

The controller may be configured to prevent or reduce local over bleaching of a laundry article when the photoactivating device (100) is positionally and/or rotationally fixed with relative to one or more laundry articles in the washing machine during an active wash cycle. The LEDs that are controlled by the controller (180) may be internal emitters (160a) and/or external emitters (160b).

The controller (180) may be configured to reduce light emitted by the light source (160) or set the light emitted by the light source (160) to a low (L) setting when signals of the motion sensing unit (170) correspond to the washing machine spin cycle.

The controller (180) may be configured to reduce light emitted by the light source (160) or set the light emitted by the light source (160) to a low (L) setting when signals of the motion sensing unit (170) correspond to an entanglement of the photoactivating device with one or more laundry articles during an active wash cycle.

At a start of the wash cycle, the controller (180) may be configured to increase light emitted by the light source (160) or set the light emitted by the light source (160) to a normal (N) setting when signals of the motion sensing unit (170) correspond to a start of a washing cycle. Detection of the wash cycle start assists with power management, primarily to extend power source life. In particular when a washing machine is programmed to commence a cycle with a delay for instance during the night, automatic detection of the wash cycle start extends power source life. It further defers activation of the one or more photoactive components in the laundry treatment composition until after the cycle has begun, thereby timing release of light-activated products to coincide with agitation of the laundry articles in laundering solvent (e.g. water) when it will have an optimum effect.

At the completion of the wash cycle, the controller (180) may be configured to reduce light emitted by the light source (160) or set the light emitted by the light source (160) to a low (L) setting, or switch off the light source when signals of the motion sensing unit (170) correspond to a completion of a washing cycle.

Figure 13:
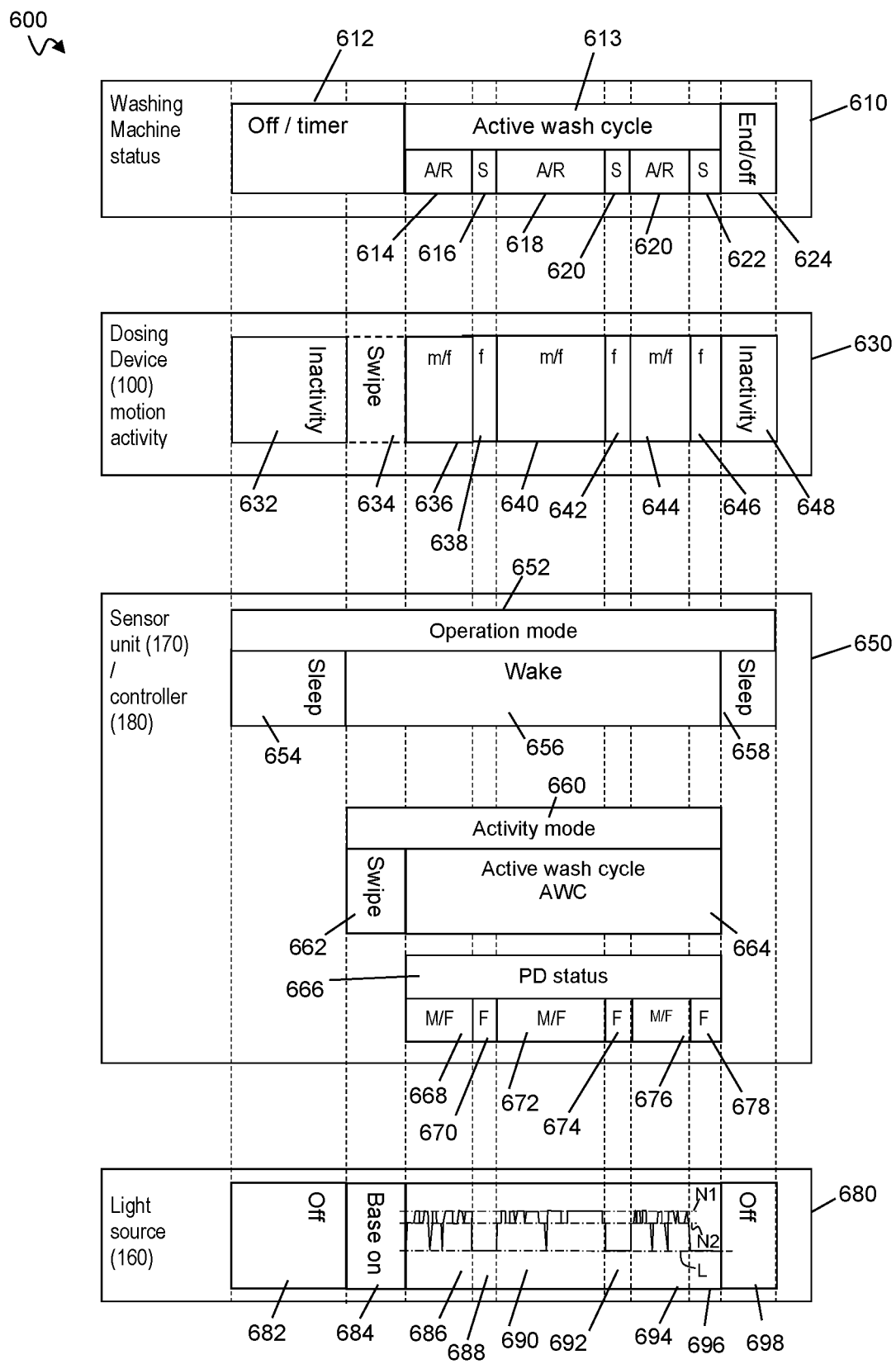
FIG. 13 shows different statuses of a washing machine, corresponding motions of the photoactivating device, corresponding modes and statuses of the photoactivating device, and corresponding output by the light source.

The controller (180) may be configured to determine from signals received from the motion sensing unit (170) an operation mode (652) which is selected from wake (656) and sleep (654, 658)—see for instance FIG. 13. In sleep (654, 658) mode, the photoactivating device (100) is typically not in use and no motion is detected. Light emission may cease or be switched off (682, 698). One or more sensors may be switched off to reduce power consumption. Sleep mode assists with power management, primarily to extend power source life. In particular when a washing machine is not emptied for a number of hours, switching to a sleep mode end extends power source life. Sleep mode may be activated by detection of little or no movement for a duration of time e.g. after 10 minutes, and is maintained as long as little or no movement is detected by the motion sensing unit (170). The operation mode may switch from sleep (654, 658) to wake (656), when the active sensors in the motion sensing unit (170) detect movement. In wake mode, more or all the motion sensors in the motion sensing unit (170) become active. In wake mode (656), the controller may be configured to determine from the motion sensing unit (170) an activity mode (660) and/or a photoactivating device status (666).

The controller (180) may be configured to determine from signals received from the motion sensing unit (170) an activity mode (660) which may be selected from swipe (662) and active wash cycle, AWC (664)—see for instance FIG. 13. The activity mode (660) is set to swipe (662) when the controller (180) determines from the motion sensing unit (170) that the photoactivating device is being swiped across a laundry article in a sweeping motion in order to pre-treat a stain with an aliquot of laundering treatment agent by the user. The controller (180) activates (684) the light source (160), in particular the external emitters (160b) in the PT region when in the swipe (662) activity mode (660). The internal emitters (160a) and/or external emitters (160b) outside the PT region may or may not be activated. The controller (180) may maintain the swipe (662) activity mode (660) for a duration of the sweeping motion, optionally for an additional period $t_{swipe}$.

Figure 8:
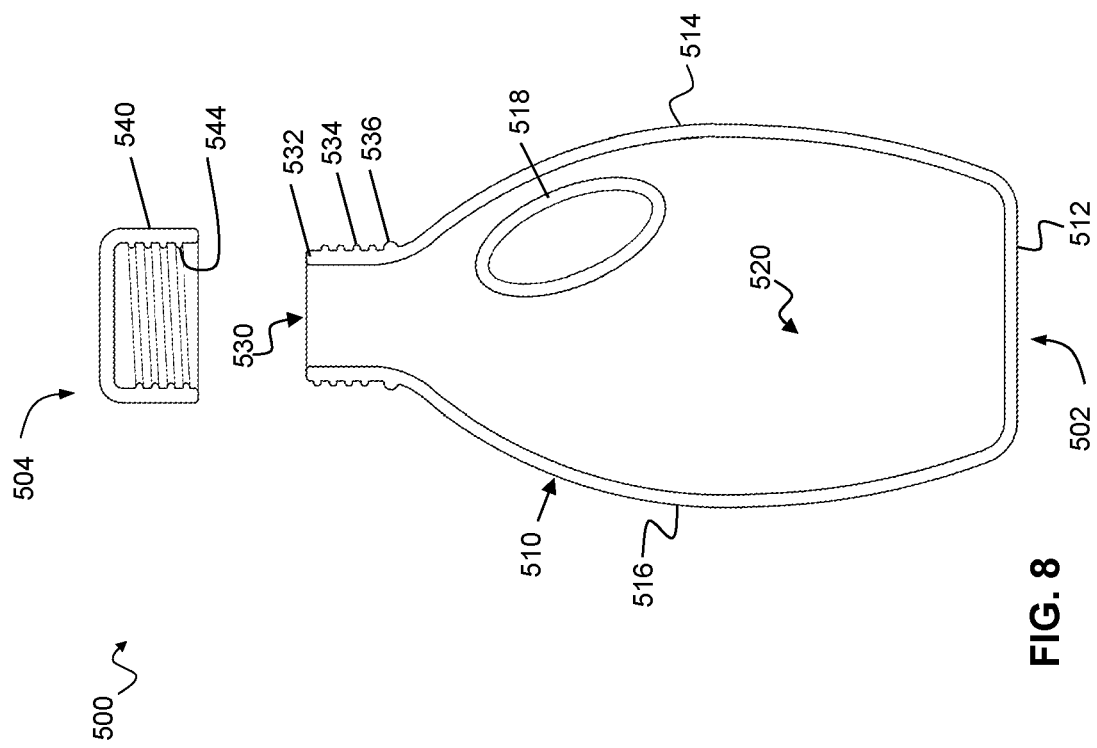
FIG. 8 shows a cross-sectional view of a container unit for a laundry treatment composition, provided with a cap.

The activity mode (660) may be set to AWC (664) (active wash cycle) when the controller (180) determines from the motion sensing unit (170) that the photoactivating device (100) is disposed within a laundering space and a washing cycle is active. The activity mode (660) is set to AWC (664) when the controller (180) determines from the motion sensing unit (170) that the photoactivating device is being moved (displaced and/or rotated) in space, consistent with a phase of a wash cycle. The controller (180) activates and regulates the light source (160) when in the AWC (664) activity mode (660)—see FIG. 8 868-696. Regulation of the light source (160) may be determined by the photoactivating device, PD, status (666) described below. Both internal emitter (160a) and external emitters (160b) may be activated. Both internal emitters (160a) and external emitters (160b) may be activated. Both internal emitters (160a) and external emitters (160b) except in the PT region may be activated. Only internal emitters (160a) may be activated. The controller (180) may maintain the AWC (664) activity mode (660) for a duration of the tumbling motion, optionally for an addition period $t_{AWC}$. In the AWC (664) activity mode (660), the controller may be configured to determine from the motion sensing unit (170) a photoactivating device status (666).

The controller (180) may be configured to determine from signals received from the motion sensing unit (170) a photoactivating device, PD, status (666) which may be selected from motion (M) or fixed (F) with respect to the laundry article. The PD status (666) may be activity mode (660) may be determined when in AWC (664) (active wash cycle) activity mode (660). In a motion (M) PD status (666), the photoactivating device (100) is determined to be moving e.g. rotation and/or travelling relative to a laundry article. Typically (M) motion PD status (666) arises during agitation (A), and sometimes an initial phase of a rest (R) period of an active wash cycle (613). In a fixed (F) PD status (666), the photoactivating device (100) is determined to be not moving e.g. rotationally and positionally fixed relative to a laundry article. Typically fixed (F) PD status (666) arises when the photoactivating device (100) is entangled by one or more laundry articles, and/or, when the washing machine is within a spin cycle (S). The controller (180) may be configured to control the light source (160) responsive to the fixed (F) or motion (M) PD status (666).

Preferably the controller (180) is configured to set light emitted by the light source (160) in the fixed (F) PD status (666) to the low (L) setting. By controlling the light source (160) according the motion of the PD status (666), local over bleaching of laundry articles is reduced or prevented. The light source (160) that is controlled by the controller (180) may be internal emitters (160a) and/or external emitters (160b).

Preferably the controller (180) is configured to set light emitted by the light source (160) in the motion (M) PD status (666) to a normal (N) setting. Movement of the photoactivating device (100) within the laundering space of the washing machine maximizes a slow-release of the products of the photoactivation. A slow release has is advantageous because a lifespan of a photoactivation product is short, and other washing processes such as agitation, enzymatic degradation, dissolution can take an effect during or before the photoactivation product.

FIG. 13 sets out mechanical movements of the photoactivating device (100) (100) (box 630) corresponding to a user pre-treatment or to a washing machine cycle (box 610), corresponding exemplary modes and statuses set by the controller (170) (box 650) responsive to signals of the sensor unit (170), and a corresponding exemplary activity of the light source (160) (box 680).

In box 610, the washing machine prior to a wash has an off status (612), and there is no activity. The off status is typically between washes or when the washing machine is set on a timer. During an active wash cycle (613), there are typically periods of agitation (A) and rest (R) followed by a spin cycle (S). During agitation, the drum, paddle, agitator, etc are actuated and the laundry articles are induced to move. Depicted as an example, the active wash cycle (613) starts with a pre-wash cycle (614, 616) comprising agitation (A) and rest (R) phases (614), followed by a spin cycle (S) (616). Following the pre-wash cycle (614, 616) is a longer main wash cycle (618, 620) comprising agitation (A) and rest (R) phases (618), followed by a spin cycle (S) (620). Following the main wash cycle (618, 620) is a rinse cycle (620, 622) comprising agitation (A) and rest (R) phases (620), followed by a spin cycle (S) (622). At the end of the active wash cycle (613), the washing machine reverts back to an off status (624).

In box 630, the photoactivating device (100) is not moved for a period and has an inactivity status (632). The inactivity status is typically when the photoactivating device (100) is stored or when the washing machine is set on a timer and the photoactivating device (100) is within the laundering space without activity. Prior to the wash cycle, the user may manually pre-treat a stain on a laundry article by applying an aliquot of laundry treatment composition directly thereon, and swiping (634) the photoactivating device (100) across the stain in order to activate the light source (160, 160b) in the pre-treatment region and the one or more photoactive components within the laundry treatment composition. During an active wash cycle (613), movements of the photoactivating device (100) may be classified as motion (m) or fixed (f) with respect to the laundry article. In motion (m), the photoactivating device (100) is moving e.g. rotation and/or travelling relative to a laundry article. Typically the photoactivating device (100) moves during an agitation (A) phase of the wash cycle, and sometimes during an initial phase of a rest (R) period of an active wash cycle (613). In a fixed motion (f), the photoactivating device is not moving e.g. rotationally and positionally fixed relative to a laundry article. Movements of the photoactivating device (100) in box 630 correspond with phases of an active wash cycle in box 610. During pre-wash cycle (614, 616), the movement of the photoactivating device (100) may be classified as motion (m) or fixed (f) (636) during the (A)/(R) stage (614) of the wash cycle, and fixed (f) (638) during the spin cycle (616). During main wash cycle (618, 620), the movement of the photoactivating device (100) may be classified as motion (m) or fixed (f) (640) during the (A)/(R) stage (618) of the wash cycle, and fixed (0 (642) during the spin cycle (616). During the rinse cycle (620, 622) the movement of the photoactivating device (100) may be classified as motion (m) or fixed (f) (644) during the (A)/(R) stage (620) of the wash cycle, and fixed (f) (646) during the spin cycle (622).

In box 650, controller (180) may set different modes and status (e.g. operation mode (652), activity mode (660), photoactivating device (PD) status (666) responsive to signals received from the sensor unit (170).

The operation mode (652) may be set to sleep (654, 658) corresponding to inactivity (632, 648) in box 630 of the photoactivating device (100), which may consume less power as mentioned elsewhere herein. The operation mode 652 may be set to wake (656) corresponding to swiping (634) or periods of motion and fixed movement (634-646) in box 630 of the photoactivating device (100), where the photoactivating device (100) consumes more energy, and the controller (170) determines from the sensor signals movements (e.g. (m), (f)) of the photoactivating device (100).

The activity mode (660) may be set to swipe (662) corresponding a swiping action (634) in box 630 of the photoactivating device (100), which may selectively illuminate the external emitters (160b) in the pre-treatment region for a duration of the swiping motion, optionally for an additional period $t_{swipe}$. The activity mode (660) may be set to AWC (664) (active wash cycle) corresponding movements of the photoactivating device (100) that may be classified as motion (m) or fixed (f) (636 to 646) in box 630, also corresponding to an active wash cycle of the washing machine in box 610.

The photoactivating device (PD) status (666) may be set to motion (M) or fixed (F) corresponding to movements of the photoactivating device (100) during an active wash cycle (613) that are classified as motion (m) or fixed (f) with respect to the laundry article in box 630. The PD status (666) may be set to (M) or (F) (668 to 678) corresponding movements of the photoactivating device (100) that may be classified as motion (m) or fixed (f) (636 to 646) in box 630, also corresponding to phases (614-622) of an active wash cycle of the washing machine in box 610.

The light source (160) in box 680 may be set to off (682, 698) corresponding to inactivity (632, 648) in box 630 of the photoactivating device (100), and a sleep (654, 658) operation mode (652) in box 650. The light source (160) in box 680, in particular external emitters (160*b*) in the PT region (e.g. base) may be illuminated (684) corresponding to a swipe (662) activity mode (660) in box 650, and a swipe motion (634) of the photoactivating device in box 630. The light source (160) in box 680 may be set to different intensity levels—normal (N1, N2), and low (L) (686 to 696) responsive to a (M) or (F) PD status (666) during the active wash cycle.

During a pre-wash cycle (686) corresponding to agitation (A) and rest (R) of the washing machine status (614), the light source (160) is predominantly at a normal (N1, N2) level, and corresponding to a (M) PD status (668). The normal level is shown as having a higher (N1) and lower (N2) level, the N1 level being more intense and selected where movement of the photoactivating device (100) is greater than in N2, but both still within the category of (M). Occasionally during pre-wash cycle (686), the light source (160) is momentarily at a low (L) level corresponding a (F) PD status (668), where the photoactivating device (100) has stopped moving in relation to a laundry article or has become entangled. During pre-wash cycle (688) corresponding to spin (S) cycle of the washing machine status (616), the light source (160) is predominantly at a low (L) level, and corresponding to a (F) PD status (670). The photoactivating device (100) stops moving in relation to a laundry article during a spin cycle.

During a main-wash cycle (690) corresponding to agitation (A) and rest (R) of the washing machine status (618), the light source (160) is predominantly at the normal (N1, N2) level, and corresponding to a (M) DD status (672). Occasionally during main-wash cycle (690), the light source (160) is momentarily at a low (L) level corresponding a (F) PD status (674), where the photoactivating device (100) has stopped moving in relation to a laundry article or has become entangled. During the main-wash cycle (692) corresponding to spin (S) cycle of the washing machine status (620), the light source (160) is predominantly at a low (L) level, and corresponding to a (F) PD status (674).

During a rinse cycle (694) corresponding to agitation (A) and rest (R) of the washing machine status (620), the light source (160) is predominantly at the normal (N1, N2) level, and corresponding to a (M) PD status (676). Occasionally during rinse cycle (694), the light source (160) is momentarily at a low (L) level corresponding a (F) PD status (676), where the photoactivating device (100) has stopped moving in relation to a laundry article or has become entangled. During the rinse cycle (696) corresponding to spin (S) cycle of the washing machine status (622), the light source (160) is predominantly at a low (L) level, and corresponding to a (F) PD status (678).

The motion sensing unit (170), or in particular the controller (180) may be configured for detection of motion within the washing machine. The motion may be a movement of the washing machine agitation unit configured to induce movement of the laundry article (e.g. rotation of the drum) and/or of the washing solvent, which implies a centrifugal acceleration and/or an angular acceleration, and the photoactivating device (100) would experience a measureable centrifugal acceleration and/or a tangential acceleration as a result.

Detection of motion may be determined from measurement of centrifugal acceleration by the motion sensing unit (170) or in particular the controller (180). When the washing machine drum rotates, the photoactivating device (100) would adopt a similar motion depending on the centrifugal forces. Centrifugal acceleration (m/s$^2$) expected to be experienced by the photoactivating device (100) can be determined from the equation $-\omega^2 \cdot r$, where $-\omega$ is the angular velocity in rad/sec and r the washing machine drum radius in metres. Alternatively, the centrifugal acceleration (m/s$^2$) can be approximately expressed as (rpm/10)$^2 \times r$, where rpm are revolutions per minute of the washing machine drum. Typical angular velocities of washing machine drums during agitation (low speed rotations) are in the 10-80 rpm (revolutions per minute) range, angular velocities may be equal to or exceed 100 rpm during other phases of a wash cycle, for example in a spin cycle they are equal to or exceed 200 rpm (e.g. 500 rpm, 800 rpm, 1000 rpm or more). Typically a washing drum machine radius r ranges from about 0.2 m to about 0.4 m, or greater.

Detection of centrifugal acceleration may be used to determine an activity mode of the washing machine, for instance, an active wash cycle (AWC), and the phases within the wash cycle such as agitation (low speed drum rotations 10-80 rpm), higher speed drum rotations (100 rpm upwards) and spin cycle (200 rpm upwards). It can also be used to determine when the photoactivating device (100) is moving in synchronisation with the drum (i.e. is maintained at a fixed position with respect to a point on the drum) (e.g. 100 rpm upwards).

The controller (180) may be configured to identify from the centrifugal acceleration an active wash cycle (AWC, see later below). The motion sensing unit (170) or in particular the controller (180) may be configured for measurement of centrifugal acceleration, for instance, equal to or greater than 0.2 m/s$^2$ (drum of radius 0.2 m rotating at 10 rpm), which is indicative of an active wash cycle.

The controller (180) may be configured to identify from the centrifugal acceleration an agitation phase (low speed drum rotation) of active wash cycle. The motion sensing unit (170) or in particular the controller (180) may be configured for measurement of centrifugal acceleration, for instance, in a range 0.2 m/s$^2$ to 26 m/$^2$ (drum of radius 0.2 to 0.4 m rotating at 10 to 80 rpm), which is indicative of agitation phase (low speed drum rotation) of an active wash cycle. The controller may be configured to set the light source (160) to normal (N) in such condition to activate the one or more photoactive components in the treatment composition.

The controller (180) may be configured to determine from a (non-zero) constant centrifugal acceleration that the photoactivating device (100) is moving in synchronisation with the drum. The constant centrifugal acceleration may be observed for a certain duration (e.g. at least 10 seconds). This would imply being trapped or entangled against an article of clothing especially during higher speed drum rotations (e.g. 100 rpm or more, corresponding to a centrifugal acceleration of, for instance, at least 20 m/s$^2$ for a drum of radius 0.2 m rotating at 100 rpm) where centrifugal forces are applied. The photoactivating device (100) is centrifuged towards the outer part of the drum and stays in prolonged contact with specific parts of a laundry articles without being able to move, due to the high centrifugal force exerted in those conditions. Under these conditions, there may be a local bleaching of the laundry articles where the photoactivating device (100) continuously emits photoactivating light to the same region of laundry article. Accordingly, controller may be configured to set the light source (160) to low (L) level (see below) to avoid local damage to the laundry articles.

The controller (180) may be configured to identify from the centrifugal acceleration a spin cycle of active wash cycle. The motion sensing unit (170) or in particular the controller (180) may be configured for measurement of centrifugal acceleration, for instance, of at least 80 m/sec$^2$ (drum of radius 0.2 m rotating at 200 rpm or higher), which is indicative of a spin cycle of an active wash cycle. During the spin cycle, the photoactivating device (100) is centrifuged towards the outer part of the drum and stays in prolonged contact with a specific parts of a laundry articles without being able to move, due to the high centrifugal force exerted in those conditions. Under these condition, there may be a local bleaching of the laundry articles where the photoactivating device (100) continuously emits photoactivating light. Accordingly, controller may be configured to set the light source (160) to low (L) level (see below) to avoid local damage to the laundry articles. The controller may be configured to set the light source (160) to low (L) level (see below) in such condition to prevent local avoid local damage to the laundry articles.

Detection of motion may in addition or alternatively be determined from measurement of linear acceleration by the motion sensing unit (170) or in particular the controller (180). Linear acceleration (m/s$^2$) expected to be experienced by the photoactivating device (100) can be determined from the angular velocity (ω of the drum as follows. Assuming an average drum rotation that accelerates from ω=0 rpm to ω=10 rpm in no more than 1 second, the angular acceleration is 1 rad/sec$^2$, which corresponds to a linear acceleration along the tangent of 1 rad/sec$^2$*0.2 m=0.2 m/sec$^2$. Accordingly, the motion sensing unit (170) or in particular the controller (180) may be configured for measurement of linear acceleration, for instance, of at least 0.1-0.2 m/sec$^2$.

The controller (180) may be configured to identify from the linear acceleration an active wash cycle. The motion sensing unit (170) or in particular the controller (180) may be configured for measurement of linear acceleration, for instance, equal to or greater than of at least 0.1-0.2 m/sec$^2$, which is indicative of an active wash cycle.

The controller (180) may be configured to identify from the linear acceleration an agitation phase (low speed drum rotation) of active wash cycle. The motion sensing unit (170) or in particular the controller (180) may be configured for measurement of linear acceleration, for instance, of at least 0.1-0.2 m/sec$^2$, which is indicative of agitation phase (i.e. entering into a low speed drum rotation) of an active wash cycle.

The controller (180) may be configured to determine from a linear velocity change, i.e. a linear acceleration and when the linear acceleration remains constant for a certain duration (e.g. 10-20 seconds or longer) that the photoactivating device (100) is entering into a phase where it will be moving in synchronisation with the drum. This would imply being trapped or entangled against an article of clothing especially during higher speed drum rotations (e.g. 100 rpm or more) where centrifugal forces are applied. The photoactivating device (100) is centrifuged towards the outer part of the drum and stays in prolonged contact with specific parts of a laundry articles without being able to move, due to the high centrifugal force exerted in those conditions. Under these condition, there may be a local bleaching of the laundry articles where the photoactivating device (100) continuously emits photoactivating light. Accordingly, controller may be configured to set the light source (160) to low (L) level (see below) to avoid local damage to the laundry articles.

For the detection of centrifugal acceleration and linear acceleration, the motion sensing unit (170) may comprise an orientation sensor and/or an accelerometer. In a preferred aspect, the controller (180) is configured to set the light source (160) to a low (L) setting when the motion sensing unit (170) detects a rate of orientation change or angular velocity that exceeds 100 rpm, which corresponds a synchronized movement of the photoactivating device (100) and drum, where the photoactivating device (100) will stay in contact with a specific fabric without being able to move, due to the high centrifugal force exerted in those conditions.

The photoactivating device (100) may further comprise a power source (190). The power source (190) provides electrical power to the light source (160) and to the controller (180) and motion sensing unit (170). The power source (190) may comprise a non-rechargeable, battery, a rechargeable battery, a capacitor, an inductive coil, or a dynamo. A rechargeable battery may be rechargeable by induction. The power source (190) may be positioned such that a weight centre of gravity of the photoactivating device (100) corresponds to a geometric centre of gravity of the photoactivating device (100). This allows even tumbling for distribution laundry treatment composition and light activation.

The laundry articles are items normally washable in a washing machine. They include garments, and other fabric items including curtains, towelling, bedding, handkerchiefs, furniture covers, and the like.

Optionally, the photoactivating device (100) may be provided with immobilised titanium dioxide. The immobilised titanium dioxide may be coated onto a surface of the photoactivating device (100) and/or provided on a support such as a filter. At least a part of the body (110) of the photoactivating device (100) may be coated with titanium dioxide. Preferably, the immobilised titanium dioxide is located so as to receive light emitted by the light source (160). The immobilised titanium dioxide may be provided on a cavity (120) wall. The immobilised titanium dioxide may be provided on an exterior wall.

The immobilised titanium dioxide may have a specific surface area between about 50 m$^2$/g to about 400 m$^2$/g. The bulk density of the immobilised titanium dioxide may be between about 100 g/l to about 800 g/l. The titanium dioxide may be a carbon modified titanium dioxide having a carbon content of between about 0.01% by weight to about 5% by weight.

Radiation in the visible spectrum of between about 380 nm and about 800 nm can activate the titanium dioxide for the purposes of photo-bleaching. Titanium dioxide can also perform as a photo-bleaching agent when radiated with radiation having wavelength between about 10 nm and about 1200 nm. Radiation in the ultraviolet spectrum may be less attractive due to potential human exposure issues.

Advantageously, immobilised titanium dioxide when photoactivated bleaches dyes present in the washing solvent. It may prevent that dyes in the washing solvent from one darker coloured laundry article are deposited on a lighter coloured laundry article. In other words it bleaches and neutralises 'fugitive dyes'.

The laundry treatment composition, also known as treatment composition herein may be formulated as a powder, liquid, suspension, emulsion suspension, tablet, pouch or other form. The treatment composition may be flowable, meaning that it is pourable from the container (510) and/or from the photoactivating device (100) where it is provided with an opening (130). The treatment composition is for the treatment of laundry articles within a washing machine.

The laundry treatment composition may be a laundry detergent or a fabric enhancer.

The treatment composition comprises one or more photoactive components. A photoactive component is one that reacts chemically to light. One of the photoactive components may be a photoactive bleaching agent.

The laundry treatment composition may comprise other components including, but not limited to, surfactants, perfumes, stabilizers, builders, bleaching agents, disinfectants, enzymes, graying inhibitors, brighteners, and the like.

The treatment composition may comprise one or more photoactive components, at least one of which may be a photoactive bleaching agent.

The treatment composition may comprise the photoactive bleaching agent, or mixtures of different photoactive bleaching agents, in a quantity such that, when the treatment composition is dissolved in the washing solvent at the recommended dosage, it will provide a photoactive bleaching agent concentration in the washing solvent between 0.005 ppm and 50 ppm, preferably between 0.01 ppm and 10 ppm, more preferably between 0.05 ppm and 5 ppm, most preferably between 0.1 ppm and 1 ppm.

The photoactive bleaching agent may be any suitable for bleaching laundry articles such as riboflavin, phloxine B, and erythrosine, or salts thereof.

For instance, a suitable photoactive bleaching agent may be riboflavin. Radiation with wavelength in the range 400 nm and 500 nm, or in the near UV range between 320 nm and 400 nm can activate the riboflavin for the purposes of photo-bleaching. The treatment composition may comprise riboflavin in a quantity ranging from about 1% to about 0.001% by weight of the treatment composition.

For instance, a suitable photoactive bleaching agent may be phloxine B. Radiation with wavelength in the range between about 500 nm and 580 nm can activate the phloxine B for the purposes of photo-bleaching. The treatment composition may comprise phloxine B in a quantity ranging from about 1% to about 0.001% by weight of the treatment composition.

For instance, a suitable photoactive bleaching agent may be erythrosine. Radiation with wavelength in the range between about 450 nm and 550 nm can activate the erythrosine for the purposes of photo-bleaching. The treatment composition may comprise erythrosine in a quantity ranging from about 1% to about 0.001% by weight of the treatment composition The container unit (500) is configured for stable storage of the laundry treatment composition. It may be configured for dispensing the laundry treatment composition, preferably by pouring, using a pump dispenser, or via a tap. It may be configured for removal of the laundry treatment composition dose where it is formulated as a tablet or pouch. The container unit (500) may be refillable or disposable after a single use.

As depicted, for instance, in FIGS. 8 to 12, the container unit (500) comprises a container (510) and a closure (e.g. cap (540), lid (542)) for sealing or closing the container. The closure may be repeateably closable. The container (510) comprises a container body (516), defining a storage volume (520) for holding a plurality of doses of the laundry treatment composition (522). The laundry treatment composition may be formulated as a liquid or gel, for instance, in the example of FIGS. 8 to 11. The laundry treatment composition may be formulated as a powder, tablet or pouch doses, for instance, in the example of FIG. 12.

The container (510) typically has a base end (502) and a top end (504). Disposed at the base end (520) is a base (512) configured to stably support the container (510) in an upright position when resting on the base (512). Extending from the base (512) is a side wall (514). The top end (504) is typically provided an opening (530) for pouring out or removal of the laundry treatment composition.

Figure 12:
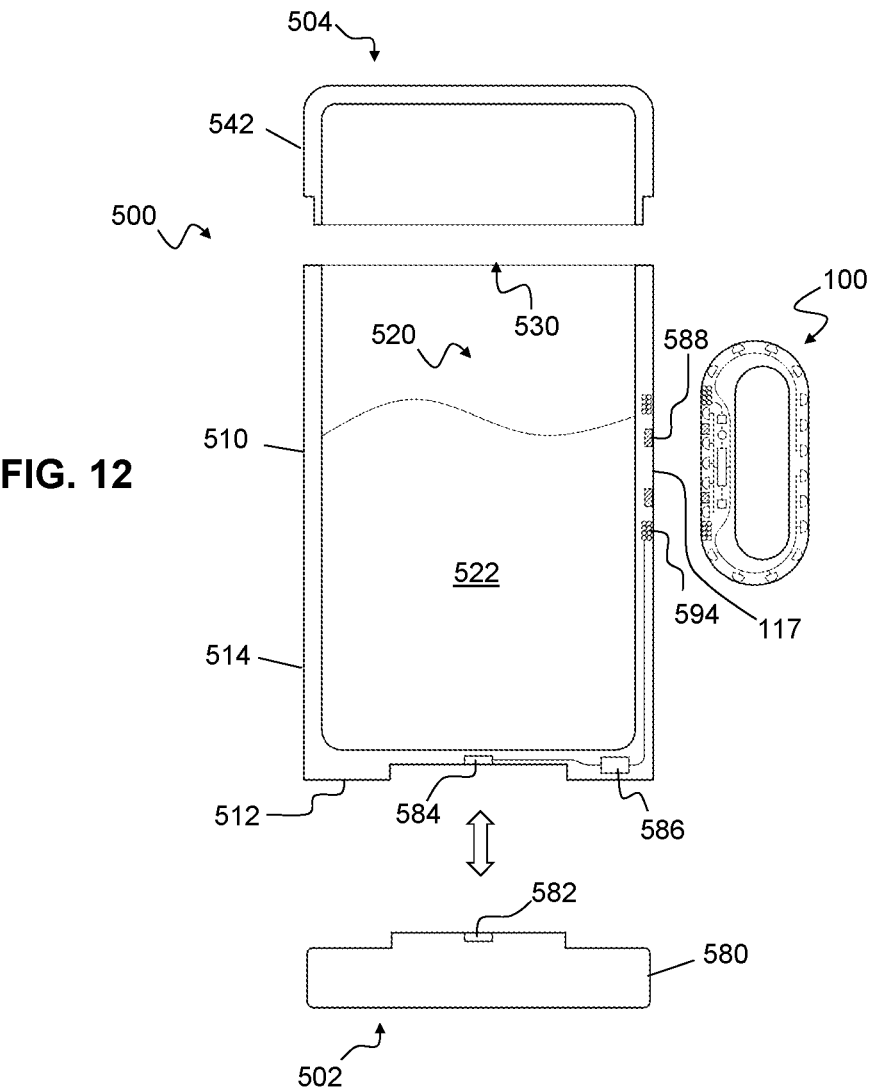
FIGS. 12 and 12A show cross-sectional views of a container unit for a laundry treatment composition, provided with a lid, a magnetic mounting for attachment to the photoactivating device and an inductive charging assembly.

In FIGS. 8 to 11, the side wall (514) narrows towards the top end to form the opening (530). The side wall (514) may narrow towards the top end to form a neck (532), optionally threaded (534), around the opening (530). In FIG. 12, the side wall (514) remains straight to form a wide opening (530) to allow manual access to the storage volume (520).

In the upright position, the laundry treatment composition is retained within the container (510). A carrying or pouring handle (518) may be integrated into the container body (516). Tilting of the container (510) allows a liquid or powered treatment composition to be poured from the opening (530).

The container unit (500) may further comprises a repeatable closure (540, 542) for sealing or closing the container (510) opening (530). The repeatable closure may comprise a threaded cap (540), as shown, for instance, in FIGS. 8 to 11. A thread (544) on the inside of the cap (540) may co-operate with a thread (534) on the outside of the container (510) neck (532), thereby sealing the container (510) storage volume (520) when the cap is tightened by rotation over the thread, and unsealing the container (510) when the cap is loosened by rotation in an opposing direction over the thread. The repeatable closure may comprise a lid (542), as shown, for instance, in FIG. 12. A rim of the lid cooperates with a rim of the opening allowing the storage volume (520) to be closed.

The container unit (500) may further comprise a coupling element (115, 117, 538, 539) for repeatable dismountable attachment of the photoactivating device (100) to the container unit (500). The coupling element may be integrated onto the threaded cap (540), for instance as a protrusion (538) onto which the photoactivating device (100) opening (130) engages and latches over (see for example FIG. 9), and a stop member (539) configured to prevent advancement of the photoactivating device (100) beyond the cap (540). The coupling element may be comprised in a projection (115) of the container (510) side wall (514), as shown, for instance in FIGS. 10 and 11. The coupling element preferably cooperates with the body (110) of the photoactivating device (100) around its opening (130). The coupling type may be push-fit, threaded and/or magnetic. The coupling element may be comprised in a region (117) of the container (510) side wall (514) that is magnetic by utilizing one or more permanent magnets (588), as shown, for instance in FIGS. 12 and 12A.

Figure 12A:
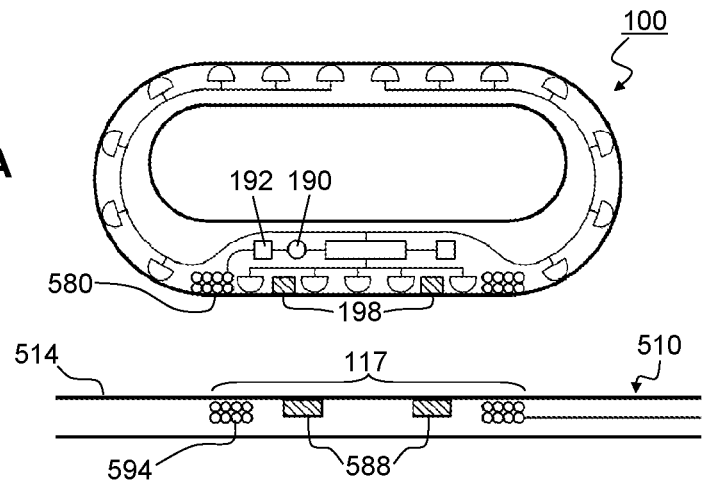

The container unit (500) may be disposed with an induction coil (594), configured for inductively charging a rechargeable battery of the photoactivating device (100), as shown, for instance, in FIGS. 11, 12 and 12A. The induction coil (594) may be connected to a charging controller (590) that is connected to a container power source (592) as shown, for instance, in FIG. 11. The charging controller is configured to regulate the flow of current from a power source to the induction coils.

The power source may be a container power source (592) comprising a battery, rechargeable or non-rechargeable. The container power source (592) may be integrated in the container. Examples of suitable non-rechargeable battery types include lithium and alkaline batteries. The container power source (592) and charging controller (590) may be disposed in a cavity within the base of the container (510).

The power source may be a mains-powered electrical adapter. The induction coil (594) may be connected to electrical contacts (584) in the base (512) of the container (510) that co-operate with complementary electrical contacts (582) disposed in a docking station (580) as shown, for instance, in FIG. 12. The container base (512) can dismountably rest on the docking station (580). When the container is engaged in the docking station (580), electrical power from the docking station, connected to a power source such as a mains-powered electrical adapter, supplies electrical power via the contacts (582, 584) to the induction coils (594). An optional regulator (586) may be control the supply of power to the induction coil (594)

The induction coil (594) may be disposed operatively with respect to the coupling element (115, 117, 538), and is configured for charging the photoactivating device (100) attached to the coupling element. The photoactivating device (100) may be provided with a complementary induction coil (196) that receives inductively current from the induction coil (594) of the container unit (500); charging current is conducted along a cable (194) to a charging regulator (192) that is connected to the power source (190) that is a rechargeable battery in the photoactivating device (100).

The container unit (500) may be made substantially from one or more opaque materials. Examples of suitable material include, but are not limited to, polyethylene, polypropylene, metal, or other material. The container unit (500) may be opaque to electromagnetic radiation in the wavelength region between about 2 nm and about 1200 nm, or even between about 380 nm to about 800 nm By opaque, it is meant that transmittance is reduced by more than about 80%, or more than about 90%, or more than about 95%, or more than about 99%, as compared to complete radiation transmission.

Further provided is a kit comprising a photoactivating device (100) and a container unit (500) as described herein.

Further provided is a kit comprising a photoactivating device (100) as described herein and a laundry treatment composition as described herein.

Further provided is a use of the photoactivating device (100) described herein for laundering laundry articles in a washing machine.

A method of laundering laundry articles comprising the steps:
  placing the photoactivating device (100) in a laundering space of the washing machine for laundering with a laundry treatment composition described herein,
  agitating by the washing machine during a wash cycle the laundry articles,
  activating by the photoactivating device (100) light source (160) one or more one or more photoactive components in the laundry treatment composition, thereby laundering the laundry articles.

Further provided is a method of laundering laundry articles comprising the steps:
  providing the photoactivating device (100) disposed with an opening (130) as described herein,
  dispensing a dose of the laundry treatment composition described herein to the cavity (120),
  placing the photoactivating device (100) in a laundering space of the washing machine,
  agitating by the washing machine during a wash cycle the laundry articles,
  activating by the photoactivating device (100) light source (160) one or more one or more photoactive components in the laundry treatment composition,
thereby laundering the laundry articles.

The method may further a comprise a step or reducing light emitted by the light source (160) or setting the light emitted by the light source (160) to a low (L) setting when signals of the motion sensing unit (170) correspond to an entanglement of the photoactivating device with one or more laundry articles or to a washing machine spin cycle during an active wash cycle.

The method may further a comprise a step of pre-treatment of an laundry article comprising;
  dispensing an aliquot of laundry treatment composition described herein onto a laundry article stain region,
  swiping or sweeping the photoactivating device (100) across the stain region, thereby activating the light source (160), preferably the external emitters (160b) in the pre-treatment region (162),
  activating by the photoactivating device (100) light source (160) one or more one or more photoactive components in the laundry treatment composition thereby pre-treating the laundry article.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A photoactivating device for deployment in a washing machine for activating one or more photoactive components in a laundry treatment composition, comprising:
  a light source configured for emission of light for activation of the one or more photoactive components,
  a controller, and
  a motion sensing unit, wherein:
    the controller is configured to control the light source responsive to signals received from the motion sensing unit, and
    the controller is configured to reduce light emitted by the light source when the signals received from the motion sensing unit correspond to a spin cycle of the washing machine indicated by a centrifugal acceleration measured by the motion sensing unit of at least 80 m/sec$^2$.

2. The photoactivating device according to claim 1, wherein the controller is configured to reduce light emitted by the light source when the signals received from the motion sensing unit are indicative of a fixed position and/or orientation of the photoactivating device relative to one or more laundry articles in the washing machine.

3. The photoactivating device according to claim 1, wherein the controller is configured to reduce light emitted by the light source when the signals received from the motion sensing unit correspond to a period of non-activation of a washing machine agitation unit configured to induce movement of laundry articles in the washing machine.

4. The photoactivating device according to claim 1, wherein the motion sensing unit comprises one or more accelerometers and/or one or more orientation sensors.

5. The photoactivating device according to claim 1, wherein the light source comprises a plurality of light emitting diodes, LEDs.

6. The photoactivating device according to claim 1, wherein the light source comprises a plurality of light emitting diodes, LEDs, wherein at least some of the LEDs are external emitters arranged to emit light into an exterior space.

7. The photoactivating device according to claim 6, wherein at least one of the external emitters is disposed in a region, a PT region, occupying ≤50% of an outside surface of the photoactivating device, optionally in a base of the photoactivating device.

8. The photoactivating device according to claim 1, further comprising a power source, optionally wherein the power source comprises a non-rechargeable battery, a rechargeable battery, a capacitor, an inductive coil, or a dynamo.

9. The photoactivating device according to claim 1, wherein the light source comprises at least 2 LEDs each emitting light of a different wavelength range.

10. A photoactivating device for deployment in a washing machine for holding a laundry treatment composition comprising one or more photoactive components, comprising:
a body defining a cavity for receiving and retaining the laundry treatment composition,
an opening to the cavity configured for receiving the laundry treatment composition,
a light source configured for emission of light for activation of the one or more photoactive components,
a controller, and
a motion sensing unit, wherein:
the controller is configured to control the light source responsive to signals received from the motion sensing unit, and
the controller is configured to reduce light emitted by the light source when the signals received from the motion sensing unit correspond to a spin cycle of the washing machine indicated by a centrifugal acceleration measured by the motion sensing unit of at least 80 m/sec².

11. The photoactivating device according to claim 10, wherein the controller is configured to reduce light emitted by the light source when the signals received from the motion sensing unit are indicative of a fixed position and/or orientation of the photoactivating device relative to one or more laundry articles in the washing machine.

12. The photoactivating device according to claim 10, wherein the controller is configured to reduce light emitted by the light source when the signals received from the motion sensing unit correspond to a period of non-activation of a washing machine agitation unit configured to induce movement of laundry articles in the washing machine.

13. The photoactivating device according to claim 11, wherein the motion sensing unit comprises one or more accelerometers and/or one or more orientation sensors.

14. The photoactivating device according to claim 10, wherein the light source comprises a plurality of light emitting diodes, LEDs, wherein at least some of the LEDs are internal emitters arranged to emit light into the cavity.

15. The photoactivating device according to claim 10, wherein the light source comprises a plurality of light emitting diodes, LEDs, wherein at least some of the LEDs are external emitters arranged to emit light into an exterior space.

16. The photoactivating device according to claim 15, wherein at least one of the external emitters is disposed in a region, a PT region, occupying ≤50% of an outside surface of the photoactivating device, optionally in a base of the photoactivating device.

17. The photoactivating device according to claim 10, further comprising a power source, optionally wherein the power source comprises a non-rechargeable battery, a rechargeable battery, a capacitor, an inductive coil, or a dynamo.

18. The photoactivating device according to claim 10, wherein the light source comprises at least 2 LEDs each emitting light of a different wavelength range.

19. A kit comprising:
a photoactivating device for deployment in a washing machine for activating one or more photoactive components in a laundry treatment composition, comprising:
a light source configured for emission of light for activation of the one or more photoactive components,
a body defining a cavity for receiving and retaining the laundry treatment composition,
an opening to the cavity configured for receiving the laundry treatment composition,
a controller, and
a motion sensing unit, wherein:
the controller is configured to control the light source responsive to signals received from the motion sensing unit, and
the controller is configured to reduce light emitted by the light source when the signals received from the motion sensing unit correspond to a spin cycle of the washing machine indicated by a centrifugal acceleration measured by the motion sensing unit of at least 80 m/sec²,
and further comprising:
a container unit for storage and dispensing of the laundry treatment composition comprising one or more photoactive components,
and/or
the laundry treatment composition comprising one or more photoactive components, optionally contained within the container unit.

20. The kit according to claim 19, wherein the one or more photoactive components is selected from riboflavin, phloxine B, erythrosine, or salts thereof.

* * * * *